US012573666B2

(12) United States Patent
Tsukamoto et al.

(10) Patent No.: US 12,573,666 B2
(45) Date of Patent: Mar. 10, 2026

---

(54) ELECTRODE PLATE, NONAQUEOUS ELECTROLYTE SECONDARY BATTERY, AND ELECTRODE PLATE MANUFACTURING METHOD

(71) Applicant: SANYO Electric Co., Ltd., Daito (JP)

(72) Inventors: Kentaro Tsukamoto, Hyogo (JP); Atsutoshi Ako, Hyogo (JP); Yoshifumi Magari, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 1043 days.

(21) Appl. No.: 17/603,727

(22) PCT Filed: Apr. 24, 2020

(86) PCT No.: PCT/JP2020/017610
§ 371 (c)(1),
(2) Date: Oct. 14, 2021

(87) PCT Pub. No.: WO2020/218473
PCT Pub. Date: Oct. 29, 2020

(65) Prior Publication Data
US 2022/0200107 A1     Jun. 23, 2022

(30) Foreign Application Priority Data
Apr. 26, 2019     (JP) ................................. 2019-085810

(51) Int. Cl.
*H01M 50/533*     (2021.01)
*H01M 10/0587*     (2010.01)
(52) U.S. Cl.
CPC ..... *H01M 10/0587* (2013.01); *H01M 50/533* (2021.01)

(58) Field of Classification Search
CPC ........................ H01M 10/0587; H01M 50/533
(Continued)

(56) References Cited

U.S. PATENT DOCUMENTS

| | | |
|---|---|---|
| 2009/0239133 A1 | 9/2009 | Kosugi |
| 2011/0067227 A1 | 3/2011 | Sohn |
(Continued)

FOREIGN PATENT DOCUMENTS

| | | |
|---|---|---|
| CN | 109155394 A | 1/2019 |
| JP | 2008-66040 A | 3/2008 |
(Continued)

OTHER PUBLICATIONS

English translation of Search Report dated Dec. 9, 2023, issued in counterpart CN Application No. 202080031436.0. (3 pages).
(Continued)

*Primary Examiner* — Niki Bakhtiari
*Assistant Examiner* — Omar M Kekia
(74) *Attorney, Agent, or Firm* — WHDA, LLP

(57)     ABSTRACT

This positive electrode plate, included in a rolled electrode body, is characterized by comprising a belt-shape positive electrode core, a positive electrode active material layer which, along the long direction of the positive electrode core, is formed in a belt shape on at least part of the surface of the positive electrode core, and a positive electrode tab which extends in the short direction of the positive electrode core from the active material layer-uncoated area of the surface of the positive electrode core where the positive electrode active material layer is not formed, and the root width H1 and the maximum width H2 of the positive electrode tab satisfy the relation $0.4 \times H2 \le H1 \le 0.9 \times H2$.

7 Claims, 4 Drawing Sheets

(58) Field of Classification Search
USPC ........................................................ 429/211
See application file for complete search history.

(56)                    References Cited

U.S. PATENT DOCUMENTS

| | | | |
|---|---|---|---|
| 2012/0177981 A1* | 7/2012 | Kim .................... | H01M 50/536 |
| | | | 429/211 |
| 2015/0010784 A1 | 1/2015 | Takahata et al. | |
| 2015/0372343 A1* | 12/2015 | Mitsuhashi ....... | H01M 10/0567 |
| | | | 429/163 |
| 2019/0103625 A1 | 4/2019 | Haraguchi et al. | |
| 2020/0185700 A1* | 6/2020 | Kamiyama ......... | H01M 10/054 |
| 2020/0321658 A1 | 10/2020 | Fukunaga et al. | |

FOREIGN PATENT DOCUMENTS

| | | |
|---|---|---|
| JP | 2008-226625 A | 9/2008 |
| JP | 2010-73653 A | 4/2010 |
| JP | 2011-65981 A | 3/2011 |
| JP | 2011-192518 A | 9/2011 |
| JP | 2012-14935 A | 1/2012 |
| JP | 2013-97903 A | 5/2013 |
| JP | 2013-175309 A | 9/2013 |
| JP | 2013-187077 A | 9/2013 |
| JP | 2016-001575 A | 1/2016 |
| JP | 2016-195015 A | 11/2016 |
| JP | 2019-61925 A | 4/2019 |
| WO | 2017/164000 A1 | 9/2017 |
| WO | 2017/204184 A1 | 11/2017 |
| WO | 2019/098056 A1 | 5/2019 |

OTHER PUBLICATIONS

International Search Report dated Jul. 21, 2020, issued in counterpart International Application No. PCT/JP2020/017610 (3 pages).
Office Action dated Sep. 3, 2024, issued in counterpart JP Application No. 2021-516236 with English translation. (8 pages).
Office Action dated Nov. 20, 2024, issued in counterpart CN Application No. 202080031436.0, with partial English translation.

* cited by examiner

Figure 4(a)          Figure 4(b)          Figure 4(c)
Figure 4(d)          Figure 4(e)          Figure 4(f)
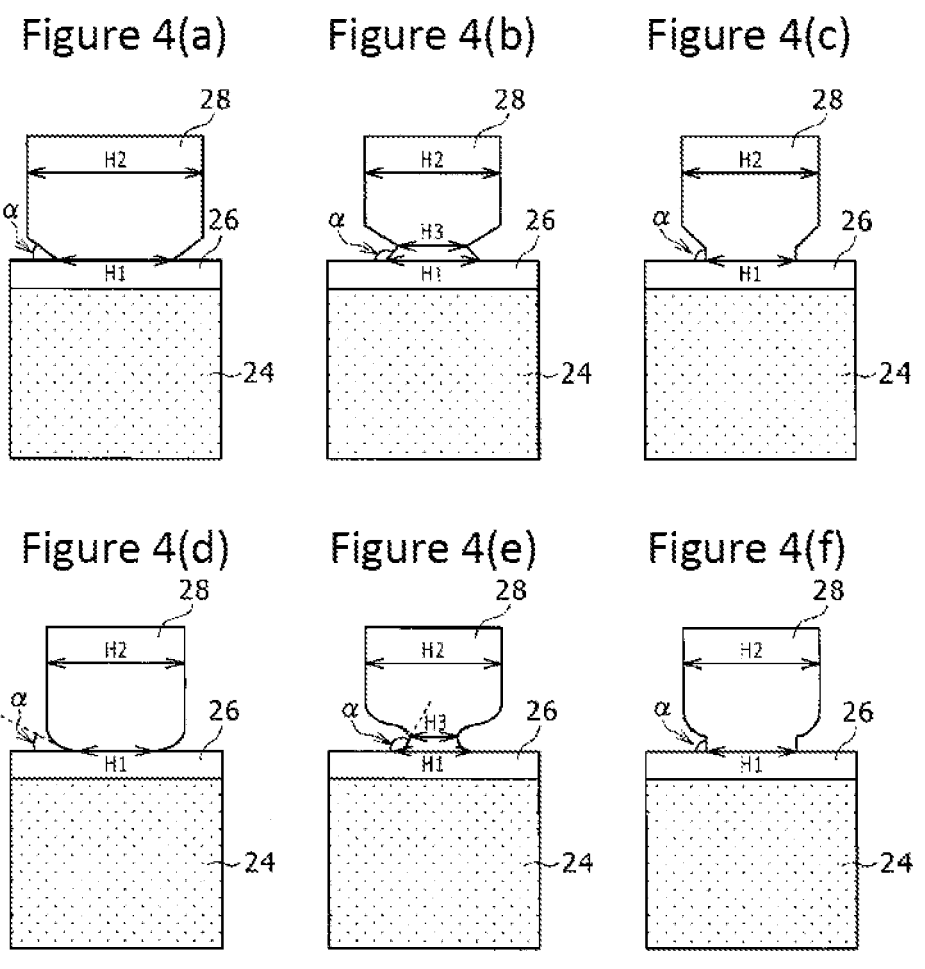
Figure 5
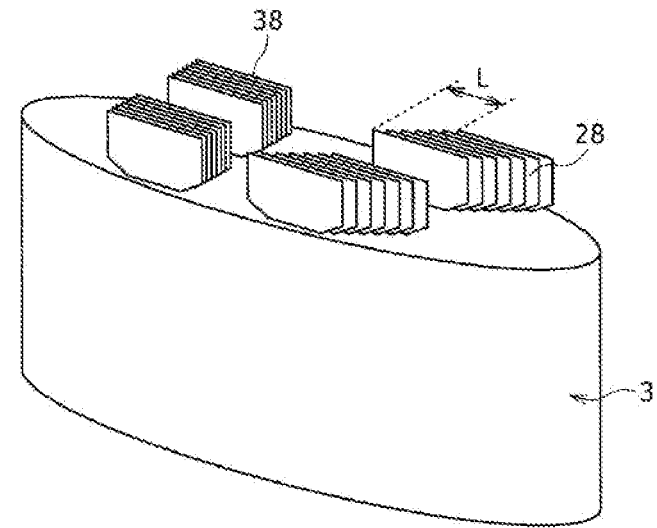

ELECTRODE PLATE, NONAQUEOUS ELECTROLYTE SECONDARY BATTERY, AND ELECTRODE PLATE MANUFACTURING METHOD

TECHNICAL FIELD

The present disclosure relates to an electrode plate, a non-aqueous electrolyte secondary battery, and a method for producing an electrode plate.

BACKGROUND ART

In recent years, a demand for enhancing the capacity of non-aqueous electrolyte secondary batteries which are used for vehicles, such as an electric vehicle, has been increasing. Therefore, there is a need to introduce a larger amount of active material into an active material layer that is formed on the surface of an electrode plate core body by high compression to achieve densification of the active material layer. A region of an electrode plate core body, the region having an active material layer on the surface thereof, is thicker than an active material layer-uncoated part where the electrode plate core body is exposed, and a tab extending from the active material layer-uncoated part, and therefore is easily stretched by compression. Accordingly, when the active material layer is compressed, strong stress is applied at the periphery of the interface between the active material layer and the active material layer-uncoated pat, so that a crack extending from the base of the tab as a starting point occurs in the core body in some cases. Patent Literature 1 discloses a method for removing the starting point of a crack in a core body by adopting a structure in which the first electrode plate tab extends from an active material layer of the first electrode plate, and the core body of the first electrode plate and the active material layer formed on the surface thereof are notched at the base of the tab.

CITATION LIST

Patent Literature

PATENT LITERATURE 1: International Publication No. WO 2017/204184

SUMMARY

However, since the active material layer is cut off in the method disclosed in Patent Literature 1, the battery capacity is lowered, and there is a possibility that a dropping of the active material from a notched part of the active material layer occurs, so that there is still room for improvements.

Accordingly, it is an object of the present disclosure to provide an electrode plate in which the occurrence of a crack in an electrode plate core body is suppressed.

The electrode plate that is one embodiment of the present disclosure is an electrode plate to be included in a wound shape electrode assembly, having: a belt-shaped electrode plate core body; an active material layer formed in a belt shape on at least a part of a surface of the electrode plate core body along a longitudinal direction of the electrode plate core body; and a tab extending in a short-length direction of the electrode plate core body from an active material layer-uncoated part, where the active material layer is not formed, on the surface of the electrode plate core body, wherein a base width H1 and a maximum width H2 of the tab satisfy a relationship of $0.4 \times H2 \leq H1 \leq 0.9 \times H2$.

A non-aqueous electrolyte secondary battery that is one aspect of the present disclosure comprises: a wound shape electrode assembly including the above electrode plate; and a battery case that houses the electrode assembly.

A method for producing an electrode plate that is one embodiment of the present disclosure is a method for producing an electrode plate to be included in a wound shape electrode assembly, including the steps of: preparing a precursor of the electrode plate, the precursor having a belt-shaped electrode plate core body, an active material slurry coating, in a belt shape, at least a part of a surface of the electrode plate core body along a longitudinal direction of the electrode plate core body, and a tab extending in a short-length direction of the electrode plate core body from an active material layer-uncoated part not coated with the active material slurry on the surface of the electrode plate core body, the tab having a base width H1 and a maximum width H2 satisfying a relationship of $0.4 \times H2 \leq H1 \leq 0.9 \times H2$; and compressing the precursor.

According to one aspect of the present disclosure, enhancing the capacity of a battery can be dealt with, and the occurrence of a crack in an electrode plate core body may be suppressed.

BRIEF DESCRIPTION OF DRAWING

FIGS. 4(a) to 4(f) are diagrams each obtained by enlarging the periphery of a positive electrode tab in one exemplary embodiment.

FIG. 5 is a diagram showing a case where positive electrode tabs are not lined up in one exemplary embodiment.

DESCRIPTION OF EMBODIMENTS

Figure 1:
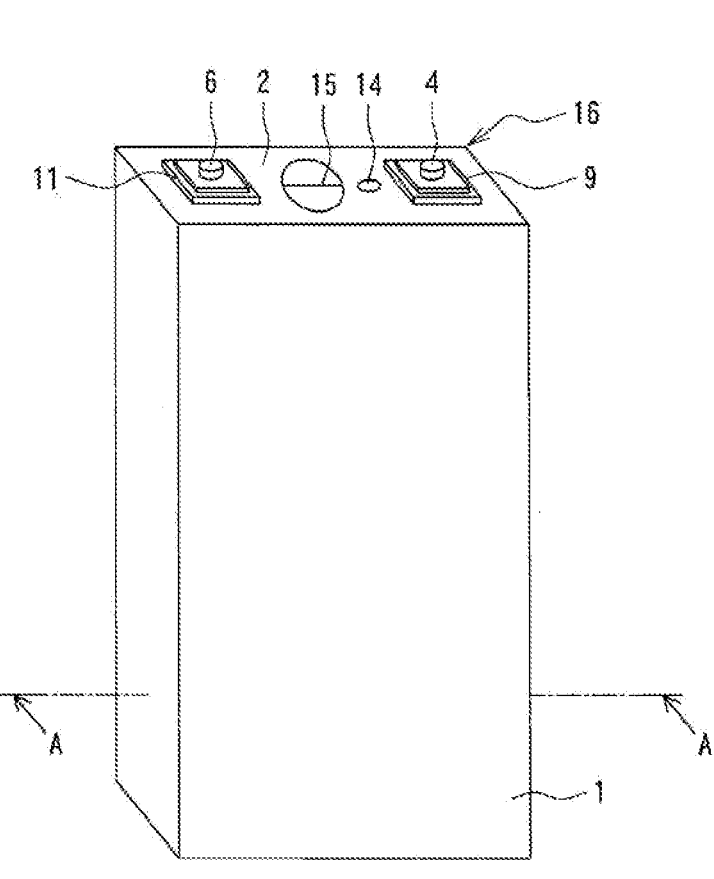
FIG. 1 is a perspective view showing a rectangular-shaped non-aqueous electrolyte secondary battery as one exemplary embodiment.
Figure 2:
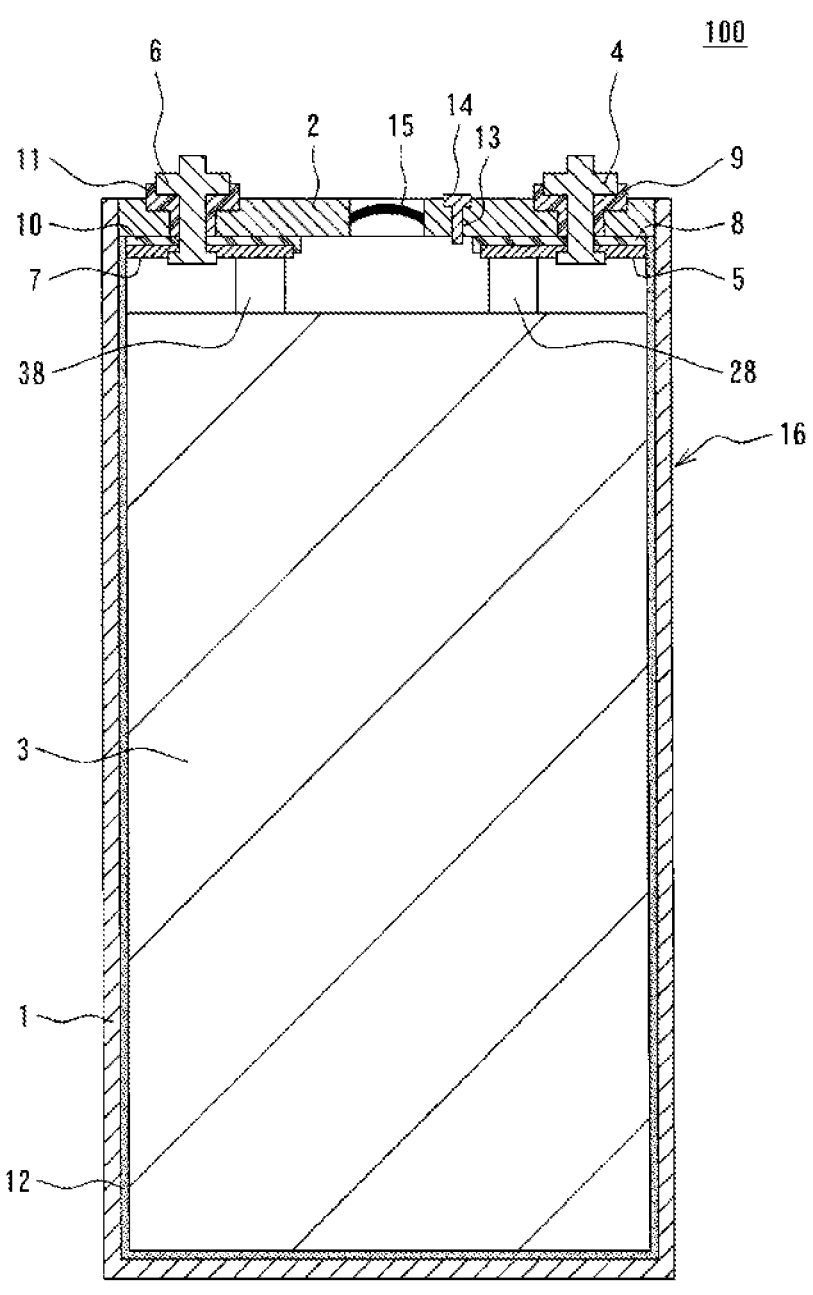
FIG. 2 is a front longitudinal section taken in direction A-A in FIG. 1.
Figure 3:
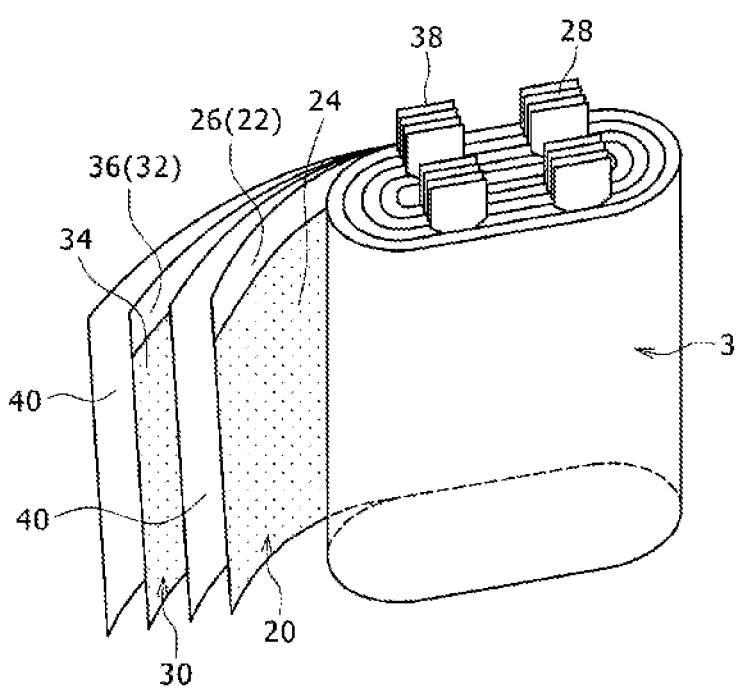
FIG. 3 is a perspective view of a wound shape electrode assembly of the non-aqueous electrolyte secondary battery shown in FIG. 2, obtained by developing an outer end of each winding.

Hereinafter, one exemplary embodiment will be described in detail. In the present specification, the vertical direction, the horizontal direction, and the depth direction of the paper surface in FIG. 1 to FIG. 3 are sometimes represented by "up and down," "right and left," and "front and back." respectively.

Using FIG. 1 and FIG. 2, the configuration of a non-aqueous electrolyte secondary battery 100 as one exemplary embodiment will be described. FIG. 1 is a perspective view showing an appearance of the non-aqueous electrolyte secondary battery 100 as one exemplar) embodiment, and FIG. 2 is a front longitudinal section taken in direction A-A in FIG. 1. As shown in FIG. 1 to FIG. 2, the non-aqueous electrolyte secondary battery 100 comprises a battery case 16 having an exterior body 1 having an opening at the top part, and a sealing plate 2 that seals the opening. Each of the exterior body 1 and the sealing plate 2 is preferably made of a metal, and can be made of, for example, aluminum or an aluminum alloy. The exterior body 1 is a rectangular-shaped, bottomed longish exterior body having a bottom part and a side wall, and having an opening at a position opposite to the bottom part. The non-aqueous electrolyte secondary battery 100 shown in FIG. 1 is an example of a rectangular-shaped non-aqueous electrolyte secondary battery having a rectangular-shaped battery case 16, but the non-aqueous electrolyte secondary battery of the present embodiment is not limited thereto. For example, the non-aqueous electrolyte secondary battery may have a battery case in which the shape of the opening is circular, oval, or elliptical, or may be a laminate non-aqueous electrolyte secondary battery having a battery case made of a laminate sheet formed by laminating a metal foil with a resin sheet, or the like. The sealing plate 2 is connected to the opening edge of the rectangular-shaped exterior body 1 by laser welding or the like.

The sealing plate 2 has an electrolytic solution injection hole 13. The electrolytic solution injection hole 13 is sealed by a sealing plug 14 after an electrolytic solution, which will be mentioned later, is injected. In addition, the sealing plate 2 has a gas discharge valve 15. This gas discharge valve 15 works when the pressure inside the battery becomes a predetermined value or more, and discharges a gas inside the battery to the outside of the battery.

A positive electrode terminal 4 is attached to the sealing plate 2 in such a way as to protrude outside the battery case 16. Specifically, the positive electrode terminal 4 is inserted into a positive electrode terminal-attaching hole formed in the sealing plate 2, and is attached to the sealing plate 2 in a state where the positive electrode terminal 4 is electrically insulated from the sealing plate 2 by an insulating member on the external side, 9, the insulating member disposed on the external side of the battery of the positive electrode terminal-attaching hole, and an insulating member on the internal side, 8, the insulating member disposed on the internal side of the battery of the positive electrode terminal-attaching hole. The positive electrode terminal 4 is electrically connected to a positive electrode current collector 5 in the battery case 16. The positive electrode current collector 5 is provided on the sealing plate 2 with the insulating member on the internal side, 8, interposed therebetween. Each of the insulating member on the internal side, 8, and the insulating member on the external side, 9, is preferably made of a resin.

Further, a negative electrode terminal 6 is attached to the sealing plate 2 in such a way as to protrude outside the battery case 16. Specifically, the negative electrode terminal 6 is inserted into a negative electrode terminal-attaching hole formed in the sealing plate 2, and is attached to the sealing plate 2 in a state where the negative electrode terminal 6 is electrically insulated from the sealing plate 2 by an insulating member on the external side, 11, the insulating member disposed on the external side of the battery of the negative electrode terminal-attaching hole, and an insulating member on the internal side, 10, the insulating member disposed on the internal side of the battery of the negative electrode terminal-attaching hole. The negative electrode terminal 6 is electrically connected to a negative electrode current collector 7 in the battery case 16. The negative electrode current collector 7 is provided on the sealing plate 2 with the insulating member on the internal side, 10, interposed therebetween. Each of the insulating member on the internal side, 10, and the insulating member on the external side, 11, is preferably made of a resin.

The non-aqueous electrolyte secondary battery 100 comprises an electrode assembly 3 and an electrolytic solution, and the exterior body 1 houses the electrode assembly 3 having a wound shape and the electrolytic solution. As will be mentioned later with reference to FIG. 3, the electrode assembly 3 has a wound structure in which a positive electrode plate 20 and a negative electrode plate 30 are wound with a separator 40 interposed therebetween. At the top part of the electrode assembly 3, positive electrode tabs 28 and negative electrode tabs 38 protrude from the positive electrode plate 20 and the negative electrode plate 30, respectively, and the positive electrode tabs 28 and the negative electrode tabs 38 are connected to the positive electrode current collector 5 and the negative electrode current collector 7, respectively, by welding or the like.

As shown in FIG. 2, the non-aqueous electrolyte secondary battery 100 may comprise an insulating sheet 12 to be disposed between the electrode assembly 3 and the exterior body 1. The insulating sheet 12, like the exterior body 1, has, for example, a bottomed box-like or a bag-like shape having an opening at the top part. When the insulating sheet 12 has a bottomed box-like or a bag-like shape having an opening at the top part, the electrode assembly 3 can be inserted from the opening of the insulating sheet 12 to cover the electrode assembly 3 with the insulating sheet 12. The material for the insulating sheet 12 is not particularly limited as long as it is a material having electrical insulation, chemical stability with which the material is not eroded by an electrolytic solution, and electrical stability with which the material is not electrolyzed against the voltage of the non-aqueous electrolyte secondary battery 100. As the material for the insulating sheet 12, a resin material, such as, for example, polyethylene, polypropylene, or polyfluoroethylene, can be used from the viewpoint of industrial versatility, production costs, and stability of product quality.

The electrolytic solution includes a solvent and an electrolyte salt dissolved in the solvent. As the solvent, a non-aqueous solvent can be used. As the non-aqueous solvent, for example, a carbonate, an ester, an ether, a nitrile, an amide, and a mixed solvent of two or more thereof may be used. Examples of the carbonate include: cyclic carbonates, such as ethylene carbonate (EC), propylene carbonate (PC), butylene carbonate, and vinylene carbonate; and chain carbonates, such as dimethyl carbonate (DMC), ethyl methyl carbonate (EMC), diethyl carbonate (DEC), methyl propyl carbonate, ethyl propyl carbonate, and methyl isopropyl carbonate. The non-aqueous solvent may contain a halogen-substituted product formed by replacing at least some of the hydrogen atoms in the solvent with a halogen atom, such as a fluorine atom. The electrolytic solution is not limited to a liquid electrolyte, but may be a solid electrolyte using a gel polymer or the like. The electrolyte salt includes a lithium salt. As the lithium salt, $LiPF_6$ or the like which is generally used as a supporting electrolyte in conventional non-aqueous electrolyte secondary batteries 100 can be used. Further, an additive, such as vinylene carbonate (VC), can appropriately be added.

FIG. 3 is a perspective view of the electrode assembly 3, obtained by developing an outer end of each winding. The electrode assembly 3 has a wound structure in which the positive electrode plate 20 and the negative electrode plate 30 are wound with the separator 40 interposed therebetween. The electrode assembly 3 is molded by being pressed after being wound, and therefore has a flat shape such that the surfaces on the front side and the back side are approximately parallel with each other, and the right and left ends are bent. In addition, two bundles of positive electrode tabs 28, each consisting of four tabs, (hereinafter, sometimes referred to as "positive electrode tab groups") protrude upward from the body part of the electrode assembly 3. Two bundles of negative electrode tabs 38, each consisting of four tabs, (hereinafter, sometimes referred to as "negative electrode tab groups") as well as the positive electrode tab groups protrude upward from the body part of the electrode assembly 3. The number of positive electrode tab groups and negative electrode tab groups and the number of electrode tabs constituting the positive electrode group and the negative electrode group are not particularly limited. Hereinafter, the positive electrode plate 20, the negative electrode plate 30, the separator 40, and particularly the positive electrode tab 28 included in the electrode assembly 3 will be described in detail with reference to FIG. 3 to FIG. 5.

[Positive Electrode]

As shown in FIG. 3, the positive electrode plate 20 has a belt-shaped positive electrode core body 22, a positive electrode active material layer 24 formed on the surface of the positive electrode core body 22, and positive electrode tabs 28 extending from one end in the short-length direction of the positive electrode core body 22.

A foil of a metal, such as aluminum, that is stable in the voltage range of the positive electrode plate 20 is used for the positive electrode core body 22. The thickness of the positive electrode core body 22, is, for example, 10 to 20 μm.

The positive electrode active material layer 24 is formed in a belt shape on at least a part of the surface of the positive electrode core body 22, along the longitudinal direction of the positive electrode core body 22. Preferably, the positive electrode active material layer 24 includes a positive electrode active material, a binder, and a conductive agent, and is provided on both surfaces of the positive electrode core body 22, at positions corresponding to each other. The positive electrode active material layer 24 can be produced by coating each surface of the positive electrode core body 22, with a positive electrode active material slurry including a positive electrode active material, a binder, a conductor, and the like, drying the coating film, and then compressing the dried coating film with a roller or the like.

The positive electrode active material contains a lithium metal composite oxide represented by a formula $Li_{1+x}M_aO_{2+b}$ (wherein x, a, and b satisfy conditions of x+a=1, $-0.2<x\leq0.2$, $-0.1\leq b\leq0.1$, and M includes Ni and Co, and includes at least one element selected from the group consisting of Mn and Al). The positive electrode active material may include a small amount of another lithium metal composite oxide or the like, but preferably contains the lithium metal composite oxide represented by the formula as a main component.

The lithium metal composite oxide may include an additional element other than Ni, Co, Mn, and Al. Examples of the additional element include alkali metal elements other than Li, transition metal elements other than Ni, Co, and Mn, alkali earth metal elements, group 12 elements, group 13 elements other than Al, and group 14 elements. Specific examples include Zr, B, Mg, Ti, Fe, Cu, Zn, Sn, Na, K, Ba, Sr, Ca, W, Mo, Nb, and Si. Particles of an inorganic compound, such as zirconium oxide, tungsten oxide, aluminum oxide, or a lanthanoid-containing compound, or the like may be firmly fixed to the surfaces of the particles of the lithium metal composite oxide.

The particle diameter of the lithium metal composite oxide is not particularly limited, but, for example, the average particle diameter is preferably 2 μm or more and less than 30 μm. When the average particle diameter is less than 2 μm, the energization by the conductive agent in the positive electrode active material layer 24 is inhibited to increase the resistance in some cases. On the other hand, when the average particle diameter is 30 μm or more, the load characteristics are deteriorated in some cases due to lowering of the reaction area. The average particle diameter is a volume average particle diameter which is measured by a laser diffraction method, and means a median diameter where the volume integration value in the particle diameter distribution reaches 50%. The average particle diameter can be measured using, for example, a laser diffraction scattering particle size distribution measurement apparatus (manufactured by HORIBA, Ltd.).

Examples of the binder included in the positive electrode active material layer 24 include fluororesins, such as polytetrafluorethylene (PTFE) and poly(vinylidene fluoride) (PVdF), polyacrylonitrile (PAN), polyimide resins, acrylic resins, and polyolefin resins. One of these binders may be used singly, or a mixture of a plurality of types of these binders may be used.

Examples of the conductive agent included in the positive electrode active material layer 24 include carbon materials, such as carbon black (CB), acetylene black (AB), Ketjen black, and graphite. One of these conductive agents may be used singly, or a mixture of a plurality of types of these conductive agents may be used.

The filling density of the positive electrode active material layer 24 may be set to 3.5 $g/cm^3$ or more. The filling density of the positive electrode active material layer 24 may be set to 4.0 $g/cm^3$ or less. The higher the filling density of the positive electrode active material layer 24, the larger is the capacity of a battery.

The positive electrode active material layer-uncoated part 26 is a region where the positive electrode active material layer 24 is not formed on the surface of the positive electrode core body 22, and the positive electrode core body 22 is exposed. The width of the positive electrode active material layer-uncoated part 26 is preferably larger than 0 mm and 3 mm or less, and more preferably 1 mm or less. When the positive electrode active material layer-uncoated part 26 has such width and exists between the positive electrode active material layer 24 and the positive electrode tab 28, the stress generated when the positive electrode active material layer 24 is compressed is relaxed to suppress the occurrence of a crack from the base of the positive electrode tab 28 as the starting point.

The positive electrode tab 28 extends in the short-length direction of the positive electrode core body 22 from the positive electrode active material layer-uncoated part 26, where the positive electrode active material layer 24 is not formed, on the surface of the positive electrode core body 22. The positive electrode plate 20 has a plurality of positive electrode tabs 28 in the longitudinal direction of the positive electrode core body 22, and the distance between the positive electrode tabs 28 in the longitudinal direction of the positive electrode core body 22 is adjusted in such a way that the positive electrode tabs 28 are lined up when the positive electrode plate 20 is wound.

In addition, a protective layer having a higher electrical resistance than the positive electrode core body 22 may be provided in such a way as to cover the positive electrode active material layer-uncoated part 26 including the base of the positive electrode tab 28. The protective layer is provided in order to suppress the occurrence of energization at an unintended part of the positive electrode active material layer-uncoated part 26. The thickness of the protective layer is, for example, 20 μm to 120 μm and, may be 50 μm to 100 μm. The protective layer may include particles of a ceramic, such as alumina, zirconia, titania, and silica, and a binder, such as poly(vinylidene fluoride) (PVdF).

Next, the shape of the positive electrode tab 28 will be described with reference to FIGS. 4(a) to 4(f). FIGS. 4(a) to 4(f) are diagrams each obtained by enlarging the periphery of a positive electrode tab 28 in one exemplary embodiment.

FIG. 4(*a*) shows a case where an angle α formed by a side of the positive electrode tab 28 and a side of the positive electrode core body 22, the side being parallel with the longitudinal direction of the positive electrode core body 22 at an intersection point of the side of the positive electrode tab 28 and the positive electrode core body 22 is an acute angle at the base of the positive electrode tab 28. The positive electrode tab 28 has a belt-shaped body part and a base part whose width is narrower than the width of the body part, and has a bilaterally symmetrical shape.

The base width H1 and the maximum width H2 of the positive electrode tab 28 satisfy a relationship of 0.4× H2≤H1≤0.9×H2. The base width H1 indicates the width of the base of the positive electrode tab 28, and the maximum width H2 indicates the maximum width of the body part of the positive electrode tab 28. When the filling density of the positive electrode active material layer 24 is made large, a crack at the base of the positive electrode tab 28 can be suppressed by making the value of the base width H1 smaller. When the filling density of the positive electrode active material layer 24 is 3.5 g/cm$^3$ to 3.7 g/cm$^3$, the base width H1 is, for example, 4 mm to 15 mm, and is more preferably 12 mm or less. When the base width H1 is 15 mm or less, the positive electrode tab 28 and the positive electrode active material layer-uncoated part 26 around the positive electrode tab 28 easily deform, and therefore the stress which is generated when the positive electrode active material layer 24 is compressed is relaxed, so that occurrence of a crack from the base of the positive electrode tab 28 can be suppressed. The maximum width H2 is, for example, 10 mm to 40 mm, and is more preferably 30 mm or less. When the length of the positive electrode plate 20 is long, the positive electrode tab groups are difficult to line up. When the length of the positive electrode plate 20 is 4000 to 5000 mm, the positive electrode tab groups can be welded to the positive electrode current collector 5 (see FIG. 2) as long as the maximum width H2 is 10 mm or more even in the case where the positive electrode tab groups each being a bundle of positive electrode tabs 28, as shown in FIG. 5, are not lined up, but shifted by a shift width L. This shift of the positive electrode tabs 28 is caused by an error in the thickness of the positive electrode plate 20 from the design value, and the positive electrode tab groups and the positive electrode current collector 5 can favorably be welded as long as the maximum width H2 is twice or more the shift width L. When the base width H1 and the maximum width H2 satisfy the relationship of 0.4×H2≤H1≤0.9×H2, the base width H1 can be made narrow while the maximum value H2 can be made wide, and therefore a higher capacity of a battery can be attained while the occurrence of a crack in the positive electrode core body 22 can be suppressed.

FIG. 4(*b*) is a diagram showing another example of the positive electrode tab 28, and shows a case where an angle α formed by a side of the positive electrode tab 28 and a side of the positive electrode core body 22, the side being parallel with the longitudinal direction of the positive electrode core body 22 at an intersection point of the side of the positive electrode tab 28 and the positive electrode core body 22 is an obtuse angle at the base of the positive electrode tab 28. The positive electrode tab 28 has a bilaterally symmetrical shape, and the positive electrode tab 28 has a constriction having a minimum width H3. FIG. 4(*c*) shows a case where an angle α formed by a side of the positive electrode tab 28 and a side of the positive electrode core body 22, the side being parallel with the longitudinal direction of the positive electrode core body 22 at an intersection point of the side of the positive electrode tab 28 and the positive electrode core body 22 is a right angle at the base of the positive electrode tab 28. FIG. 4(*d*) and FIG. 4(*e*) each show a case where a side of the positive electrode tab 28 connected to the positive electrode core body 22 is a curved line at the base of the positive electrode tab 28. In this case, an angle formed by the tangential line of a side of the positive electrode tab 28 and a side of the positive electrode core body 22, the side being parallel with the longitudinal direction of the positive electrode core body 22, at the base of the positive electrode tab 28 is a. Accordingly, FIG. 4(*d*) shows a case where the angle α is an acute angle, and FIG. 4(*e*) shows a case where the angle α is an obtuse angle. FIG. 4(*f*) shows a case where the angle α formed by the tangential line of a side of the positive electrode tab 28 and a side of the positive electrode core body 22, the side being parallel with the longitudinal direction of the positive electrode core body 22 is a right angle at the base of the positive electrode tab 28, and a curved line is included in a part of the side that specifies the width direction of the positive electrode tab 28.

When the angle α is an acute angle, design can be performed by using the set base width H1 as the minimum width in the positive electrode tab 28. The resistance of the positive electrode tab 28 is determined by the minimum width of the positive electrode tab 28, and therefore by setting the base width H1 optimally, design by which a decrease in resistance by the positive electrode tab 28 is suppressed to the minimuu can be performed. On the other hand, when the angle α is an obtuse angle, a crack which occurs from the base of the positive electrode tab 28 in the longitudinal direction of the positive electrode core body 22 is further unlikely to occur.

The positive electrode tab 28 does not need to have a bilaterally symmetrical shape, but to avoid uneven distribution of the stress which occurs when the positive electrode active material layer 24 is compressed and suppress a crack in the positive electrode core body 22, the positive electrode tab 28 preferably has a bilaterally symmetrical shape. In addition, each of the positive electrode tabs 28 may have a different shape, but to bundle the positive electrode tabs 28 up, each of the positive electrode tabs 28 preferably has the same shape.

Next, a method for producing the positive electrode plate 20 will be described. The method for producing the positive electrode plate 20 includes the following steps of: preparing a precursor of the positive electrode plate 20; and compressing the precursor. Firstly, the surface of the positive electrode core body 22 is coated with a positive electrode active material slurry in a belt shape leaving the positive electrode active material layer-uncoated part 26 uncoated, and the positive electrode active material slurry is dried. Next, the metal foil is cut in such a way that the positive electrode tabs 28 are cut out from the positive electrode active material layer-uncoated part 26, and thereby the precursor of the positive electrode plate 20 is prepared. Thereafter, the precursor of the positive electrode plate 20 is compressed with a roller or the like, and thereby the positive electrode plate 20 can be produced. When the positive electrode tabs 28 are cut out from the positive electrode active material layer-uncoated part 26, a punching die, a cutter, an energy beam, such as laser light, or the like can be used. An energy beam is preferably used because frequent replacement operation due to wear of a punching die or a cutter is unnecessary.

[Negative Electrode]

The negative electrode plate 30 has a negative electrode core body 32 made of a metal, and a negative electrode active material layer 34 formed on the surface of the negative electrode core body 32 and including a negative electrode active material. A foil of a metal, such as copper, that is stable in the voltage range of the negative electrode plate 30 can be used for the negative electrode core body 32. The thickness of the negative electrode core body 32 is, for example, 5 to 15 μm.

Preferably, the negative electrode active material layer 34 includes a negative electrode active material and a binder, and is provided on both surfaces of the negative electrode core body 32 at positions corresponding to each other. The negative electrode plate 30 can be produced by coating the negative electrode core body 32 with a negative electrode active material slurry including a negative electrode active material, a binder, and the like, drying the coating film, and then compressing the dried coating film with a roller or the like, thereby forming the negative electrode active material layer 34 on both surfaces of the negative electrode core body 32.

Examples of the negative electrode active material include low crystalline carbon-covered graphite obtained by forming a coating of low crystalline carbon on the surface of graphite. The low crystalline carbon is a carbon material which is in a state of being amorphous or a microcrystal, and has a turbostratic structure in which the crystal structure of graphite is not grown, or a carbon material which does not have a circular shape or a scale-like shape, and has an extremely fine particle diameter. For example, a carbon material having a d(002) interplanar spacing larger than 0.340 nm, as measured by X-ray diffraction, is a low crystalline carbon. In addition, a carbon material having an average particle diameter of primary particles of 1 μm or less, as observed and measured by a scanning electron microscope (SEM) or the like, is also a low crystalline carbon material. Specific examples of the low crystalline carbon include hard carbon (hardly graphitizable carbon), soft carbon (easily graphitizable carbon), carbon black, such as acetylene black, Ketjen black, thermal black, and furnace black, carbon fiber, and activated carbon. The negative electrode active material is not particularly limited as long as it is a material that can reversibly absorb and desorb lithium ions, and, for example, a carbon material, such as natural graphite and artificial graphite, a metal, such as silicon (Si) and tin (Sn), that can be alloyed with lithium, or an oxide including a metal element, such as Si and Sn, or the like can be used. In addition, the negative electrode active material layer 34 may include a lithium titanium composite oxide.

As the binder included in the negative electrode active material layer 34, a known binder can be used, and fluororesins, such as PTFE and PVdF, PAN, polyimide resins, acrylic resins, polyolefin resins, and the like can be used as in the case of the positive electrode active material layer 24. In addition, examples of the binder which is used when the negative electrode active material slurry is prepared using an aqueous solvent include CMC or a salt thereof, styrene butadiene rubber (SBR), polyacrylic acid (PAA) or a salt thereof and polyvinyl alcohol (PVA).

The negative electrode tab 38 extends in the short-length direction of the negative electrode core body 32 from the negative electrode active material layer-uncoated part 36, where the negative electrode active material layer 34 is not formed, on the surface of the negative electrode core body 32. The negative electrode plate 30 has a plurality of negative electrode tabs 38 in the longitudinal direction of the negative electrode core body 32, and the distance between the negative electrode tabs 38 in the longitudinal direction of the negative electrode core body 32 is adjusted in such a way that the negative electrode tabs 38 are lined up when the negative electrode plate 30 is wound. In the present embodiment, the negative electrode core body 32 extends to form the negative electrode tab 38. Specifically, the negative electrode core body 32, the electrode current collector having negative electrode tabs 38, is produced by cutting the metal foil into a shape such that the negative electrode tabs 38 are connected to the negative 32 electrode core body.

In the negative electrode tab 38 as well as the positive electrode tab 28, the width of the base may be narrow. When the density of the negative electrode active material layer 34 is enhanced, the problem which is similar to that of the positive electrode plate 20 occurs, and therefore the base width H1 and the maximum width H2 of the negative electrode tab 38 may satisfy a relationship of 0.4× H2≤H1≤50.9×H2. In addition, the shape of the negative electrode tab 38 may be the same as or different from the shape of the positive electrode tab 28.

[Separator]

An ion-permeable and insulating porous sheet is used as the separator 40. Specific examples of the porous sheet include a microporous film, woven fabric, and nonwoven fabric. Suitable examples of the material for the separator 40 include olefin resins such as polyethylene and polypropylene, and cellulose. The separator 40 may be a laminate having a cellulose fiber layer and a layer of fibers of a thermoplastic resin such as an olefin resin. The separator 40 may be a multi-layered separator including a polyethylene layer and a polypropylene layer, and the separator 40 a surface of which is coated with a resin such as an aramid resin, or with inorganic fine particles of alumina, titania, or the like can also be used.

Hereinafter, the present embodiment will further be described with Examples, but the present disclosure is not limited to these Examples.

Example 1

[Production of Positive Electrode Plate]

A positive electrode active material slurry was prepared by mixing a lithium nickel cobalt manganese oxide as a positive electrode active material, 2% by mass of carbon black based on the mass of the positive electrode active material, and 1% by mass of poly(vinylidene fluoride) (PVdF) based on the mass of the positive electrode active material, then adding N-methyl-2-pyrrolidone (NMP), and stirring a resultant mixture using a mixer (T.K. HIVIS MIX, manufactured by PRIMIX Corporation). Both surfaces of a positive electrode core body, the electrode current collector formed of an aluminum foil having a thickness of 13 μm, were coated in a belt shape at positions corresponding to each other with the positive electrode active material slurry in such a way that the positive electrode active material layer-uncoated part 26 was formed, and the positive electrode active material slurry was then dried.

A positive electrode core body, the electrode current collector having positive electrode tabs, was produced by cutting the positive electrode active material layer-uncoated part 26 into a shape such that the positive electrode tabs extend from the positive electrode core body using laser light. The positive electrode tab had a shape as shown in FIG. 4(*a*), and had a base width H1 of 12 mm and a maximum width H2 of 30 mm. The positive electrode core body had a length of 4750 mm, the positive electrode active material layer-uncoated part had a width of 1 mm, and two groups of the positive electrode tabs, each consisting of 17 positive electrode tabs were provided. The distance between the positive electrode tabs was designed based on the state of having a thickness thinner than the thickness of the positive electrode plate, which was assumed after compression, by 4 μm, in such a way that the positive electrode plate was shifted intentionally.

Thereafter, the positive electrode precursor was compressed with a roller. A region where the positive electrode active material layer forms a surface had a thickness of 180 μm before the compression and 136 μm after the compression. The positive electrode active material layer after the compression had a filling density of 3.5 g cm$^3$.

[Production of Negative Electrode Plate]

A negative electrode active material slurry was prepared by mixing graphite as a negative electrode active material, 1% by mass of styrene butadiene rubber (SBR) based on the mass of the negative electrode active material, and 1% by mass of carboxymethyl cellulose based on the mass of the negative electrode active material, then adding water, and stirring a resultant mixture using a mixer (T.K. HIVIS MIX, manufactured by PRIMIX Corporation). Both surfaces of a negative electrode core body were coated in a belt shape at positions corresponding to each other with the negative electrode active material slurry, the negative electrode active material slurry was then dried and compressed with a roller. A negative electrode core body, the electrode current collector having negative electrode tabs, was produced by cutting a copper foil having a thickness of 8 μm into a shape such that the negative electrode tabs extend from the negative electrode core body. The shape of the negative electrode tab was the same as the shape of the positive electrode tab. The negative electrode core body had a length of 5073 mm, the negative electrode active material layer-uncoated part had a width of 0 mm, and the positions of the negative electrode tabs were designed in such a way that two groups of the negative electrode tabs each consisting of 18 negative electrode tabs were provided. Thus, a negative electrode plate having a negative electrode active material layer formed on each surface of the negative electrode core body and having a thickness of 160 μm was produced.

[Production of Electrode Assembly]

The positive electrode plate and the negative electrode plate were wound with a polyethylene microporous film separator having a thickness of 16 μm interposed therebetween, and press molding was then performed, thereby producing a flat, wound shape electrode assembly.

Example 2 and Comparative Examples 1 to 3

With respect to Example 2 and Comparative Examples 1 to 3, a positive electrode plate, a negative electrode plate, and an electrode assembly were produced by the same methods as in Example 1, except that the base width H1 and the maximum width H2 were changed as shown in Table 1.

[Evaluation of Whether Crack Occurred or Not]

The positive electrode plates were observed visually before the electrode assemblies were produced to evaluate whether a crack from the base of a tab as a starting point had occurred or not. A positive electrode plate in which a crack was observed was evaluated as "Occurred," and a positive electrode plate other than that was evaluated as "Not occurred."

[Evaluation of Weldability]

In the produced electrode assemblies, the positive electrode tabs had a shift width L of 7 mm. When the maximum width H2 was twice or more the shift width L of the positive electrode tabs, that is, when the maximum width H2 was 14 mm or more, the electrode assembly was evaluated as "Good," and when the maximum width H2 was other than that, the electrode assembly was evaluated as "Poor."

Table 1 shows Evaluation results on the Examples and the Comparative Examples.

TABLE 1

| | Tab shape | | | Evaluation results | |
| | Base width H1 | Maximum width H2 | | | |
| | (mm) | (mm) | H1/H2 | Crack | Weldability |
|---|---|---|---|---|---|
| Example 1 | 12 | 30 | 0.4 | Not occur | Good |
| Example 2 | 12 | 14 | 0.9 | Not occur | Good |
| Comparative Example 1 | 12 | 12 | 1 | Not occur | Poor |
| Comparative Example 2 | 30 | 30 | 1 | Occurred | Good |
| Comparative Example 3 | 16 | 16 | 1 | Occurred | Good |

As can be seen from Table 1, it was ascertained that when the base width H1 and the maximum width H2 of the positive electrode tab satisfies the relationship of 0.4×H2≤H1≤0.9×H2, the weldability is secured, and the occurrence of a crack can be suppressed.

REFERENCE SIGNS LIST 1 exterior body
2 sealing plate
3 electrode assembly
4 positive electrode terminal
5 positive electrode current collector
6 negative electrode terminal
7 negative electrode current collector
8, 10 insulating member on internal side
9, 11 insulating member on external side
12 insulating sheet
13 electrolytic solution injection hole
14 sealing plug
15 gas discharge valve
16 battery case
20 positive electrode plate
22 positive electrode core body
24 positive electrode active material layer
26 positive electrode active material layer-uncoated part
28 positive electrode tab
30 negative electrode plate
32 negative electrode core body
34 negative electrode active material layer
36 negative electrode active material layer-uncoated part
38 negative electrode tab
40 separator
100 non-aqueous electrolyte secondary battery

The invention claimed is:

1. An electrode plate to be included in a wound shape electrode assembly, having:
   a belt-shaped electrode plate core body having a first side and a second side which are opposite to each other and extend in a longitudinal direction, the first side extending straight in the longitudinal direction;
   an active material layer formed in a belt shape on at least a part of a surface of the electrode plate core body along the longitudinal direction of the electrode plate core body; and
   a tab extending in a short-length direction of the electrode plate core body from the first side of the electrode plate core body, wherein the active material layer is located away for the first side of the electrode plate such that the surface of the electrode plate core body includes an active material layer-uncoated part which includes the first side and on which where the active material layer is not formed, the tab has two sides which are opposite to each other and extend from two intersection points on the first side of the electrode plate core body in directions away from the electrode plate core body, wherein at the two intersection points, an angle formed by the first side of the electrode plate core body and each of the two sides of the tab is an acute angle at a base of the tab, and a base width H1 of the tab which is a distance between the two intersection points and a maximum width H2 of the tab satisfy a relationship of $0.4 \times H2 \le H1 \le 0.9 \times H2$.

2. The electrode plate according to claim 1, wherein the base width H1 of the tab is 12 mm or less.

3. The electrode plate according to claim 1, wherein the active material layer has a filling density of 3.5 g/cm³ or more and 3.7 g/cm³ or less.

4. The electrode plate according to claim 1, wherein the electrode plate is a positive electrode plate.

5. A non-aqueous electrolyte secondary battery, comprising:

a wound shape electrode assembly including the electrode plate according to claim 1; and a battery case housing the electrode assembly.

6. A method for producing an electrode plate to be included in a wound shape electrode assembly, comprising the steps of:

preparing a precursor of the electrode plate, the precursor including a belt-shaped electrode plate core body having a first side and a second side which are opposite to each other and extend in a longitudinal direction, the first side extending straight in the longitudinal direction, an active material slurry coating, in a belt shape, at least a part of a surface of the electrode plate core body along the longitudinal direction of the electrode plate core body, and a tab extending in a short-length direction of the electrode plate core body from the first side of the electrode plate core body, wherein the active material slurry is located away for the first side of the electrode plate such that the surface of the electrode plate core body includes an active material layer-uncoated part which includes the first side and on which where an active material layer is not formed, the tab has two sides which are opposite to each other and extend from two intersection points on the first side of the electrode plate core body in directions away from the electrode plate core body, at the two intersection points, an angle formed by the first side of the electrode plate core body and each of the two sides of the tab is an acute angle at a base of the tab, and the tab has a base width H1 which is a distance between the two intersection points and a maximum width H2 satisfying a relationship of $0.4 \times H2 \le H1 \le 0.9 \times H2$; and compressing the precursor.

7. The method for producing an electrode plate according to claim 6, wherein the step of preparing the precursor of the electrode plate includes a step of forming the tab by processing the active material layer-uncoated part using an energy beam.

* * * * *